US012644993B2

(12) United States Patent
Oudrhiri et al.

(10) Patent No.: US 12,644,993 B2
(45) Date of Patent: Jun. 2, 2026

(54) SYSTEMS AND METHODS FOR A GLOBAL POSITIONING SYSTEM USING GNSS SIGNALS AND STOKES PARAMETERS

(71) Applicant: California Institute of Technology, Pasadena, CA (US)

(72) Inventors: Kamal Oudrhiri, Pasadena, CA (US); Javier Bosch-Lluis, Pasadena, CA (US); Nereida Rodriguez Alvarez, Pasadena, CA (US); Joan F. Munoz, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 230 days.

(21) Appl. No.: 18/489,802

(22) Filed: Oct. 18, 2023

(65) Prior Publication Data

US 2024/0134061 A1 Apr. 25, 2024

Related U.S. Application Data

(60) Provisional application No. 63/417,115, filed on Oct. 18, 2022.

(51) Int. Cl.
*G01S 19/22* (2010.01)
*G01S 19/37* (2010.01)

(52) U.S. Cl.
CPC .............. *G01S 19/22* (2013.01); *G01S 19/37* (2013.01)

(58) Field of Classification Search
CPC ................................ G01S 19/22; G01S 19/37
(Continued)

(56) References Cited

U.S. PATENT DOCUMENTS 6,122,404 A * 9/2000 Barter .................... G02B 27/28
382/254
12,332,359 B2 * 6/2025 Tapucu ................... G01S 19/22
(Continued)

FOREIGN PATENT DOCUMENTS

CN 111024076 B * 4/2022 ............. G01C 21/18
CN 114894312 A * 8/2022 ................ G01J 4/00

OTHER PUBLICATIONS

CYGNSS Level 1 Science Data Record Version 3.0, PO.DAAC / JPL / NASA, Retrieved from internet: https://doi.org/10.5067/CYGNS-L1X30, Retrieved on Nov. 19, 2025, 1 pg.
(Continued)

*Primary Examiner* — Harry K Liu
(74) *Attorney, Agent, or Firm* — KPPB LLP

(57) ABSTRACT

Systems and methods for a global positioning system using Global Navigation Satellite System (GNSS) signals and Stokes Parameters in accordance with embodiments of the invention are illustrated. One embodiment includes a GNSS. The GNSS includes at least four satellites and a receiver. Each satellite includes at least one pair of antennas, and a transmitter configured to transmit GNSS positioning signals to a receiver. The receiver includes a memory containing a positioning application, and a processor comprising a set of one or more processors, the positioning application configures the processors to determine a position of the receiver by performing the steps of collecting horizontal and vertical linear components of transmitted GNSS positioning signals, computing Stokes parameters of collected GNSS signals, obtaining tuning parameters based on computed Stokes parameters, synthesizing new polarization signal using tuning parameters, and processing new polarization signal to obtain a position of the location.

25 Claims, 10 Drawing Sheets

Different applications of Hybrid Compact Polarimetric GNSS Receivers: Navigation (left) and Reflectometry (right)

(58) Field of Classification Search
    USPC ..................................................... 342/357.61
    See application file for complete search history.

(56) References Cited

U.S. PATENT DOCUMENTS

2021/0148811 A1 *   5/2021   Shaw ................... G01N 21/538
2024/0159688 A1     5/2024   Oudrhiri et al.

OTHER PUBLICATIONS

NASA Earthdata, Retrieved from internet: https://www.earthdata.nasa.gov/, Retrieved on Nov. 19, 2025, 7 pgs.

Brisco et al., "Hybrid Compact Polarimetric SAR for Environmental Monitoring with the RADARSAT Constellation Mission", Remote Sensing, vol. 12, No. 20, Article 3283, Oct. 9, 2020, 20 pgs., doi: 10.3390/rs12203283.

Carreno-Luengo et al., "Spaceborne GNSS-R from the SMAP Mission: First Assessment of Polarimetric Scatterometry over Land and Cryosphere", Remote Sensing, vol. 9, No. 4, Article 362, Apr. 12, 2017, 23 pgs., doi: 10.3390/rs9040362.

Chaubell et al., "Smap L3 Radiometer Global Daily 36 km EASE-Grid Soil Moisture, Version 8", National Snow and Ice Data Center, Distributed Active Archive Center, Boulder, Colorado USA, 2021, 34 pgs., doi: 10.5067/OMHVSRGFX38O.

Entekhabi et al., "SMAP Handbook-Soil Moisture Active Passive: Mapping Soil Moisture and Freeze/Thaw from Space", Retrieved from internet: https://smap.jpl.nasa.gov/files/smap2/SMAP_Handbook_FINAL_1_JULY 2014.Web.Pdf, Retrieved on Nov. 19, 2025, 192 pgs.

Gleason et al., "The CYGNSS Level 1 Calibration Algorithm and Error Analysis Based on On-Orbit Measurements", IEEE Journal of Selected Topics in Applied Earth Observations and Remote Sensing, vol. 12, No. 1, Jan. 2019, pp. 37-49, doi: 10.1109/JSTARS.2018.2832981.

Guissard, "Mueller and Kennaugh matrices in radar polarimetry", IEEE Transactions on Geoscience and Remote Sensing, vol. 32, No. 3, May 1994, pp. 590-597, doi: 10.1109/36.297977.

Marquis et al., "The GPS Block IIR and IIR-M Broadcast L-band Antenna Panel: Its Pattern and Performance", Navigation: Journal of The Institute of Navigation, vol. 62, No. 4, 2015, pp. 329-347, doi: 10.1002/navi. 123.

Nord et al., "Comparison of Compact Polarimetric Synthetic Aperture Radar Modes", IEEE Transactions on Geoscience and Remote Sensing, vol. 47, No. 1, Jan. 2009, pp. 174-188, doi: 10.1109/TGRS.2008.2000925.

Raney, "Hybrid-Polarity SAR Architecture", IEEE Transactions on Geoscience and Remote Sensing, vol. 45, No. 11, Nov. 2007, pp. 3397-3404, doi: 10.1109/TGRS.2007.895883.

Raney et al., "RADARSAT Constellation Mission's Operational Polarimetric Modes: A User-Driven Radar Architecture", Canadian Journal of Remote Sensing, vol. 47, No. 1, 2021, 16 pgs., doi: 10.1080/07038992.2021.1907566.

Ruf, "Cygnss handbook Cyclone Global Navigation Satellite System: Deriving surface wind speeds in tropical cyclones", National Aeronautics and Space Administration (NASA), Retrieved from internet: https://isulibrary.isunet.edu/index.php?lvl=notice_display&id=10295, retrieved on Nov. 19, 2025, 1 pg.

Souissi et al., "Investigation of the capability of the Compact Polarimetry mode to Reconstruct Full Polarimetry mode using RADARSAT2 data", Advanced Electromagnetics, vol. 1, No. 1, May 2012, pp. 19-28, doi: 10.7716/aem.v1i1.12.

Tomar et al., "Evaluation of Hybrid Polarimetric Decomposition Techniques for Forest Biomass Estimation", IEEE Journal of Selected Topics in Applied Earth Observations and Remote Sensing, vol. 12, No. 10, Oct. 2019, pp. 3712-3718, doi: 10.1109/JSTARS.2019.2947088.

Ulaby et al., "Radar Polaritnetry for Geoscience Application", Geocarto International, vol. 5, No. 3, 1990, p. 38, doi: 10.1080/10106049009354274.

Wang et al., "Three-Component Decomposition Based on Stokes Vector for Compact Polarimetric SAR", Sensors, vol. 15, No. 9, Sep. 18, 2015, p. 24087-24108, doi: 10.3390/s150924087.

Zavorotny et al., "Scattering of GPS Signals from the Ocean with Wind Remote Sensing Application", IEEE Transactions on Geoscience and Remote Sensing, vol. 38, No. 2, Mar. 2000, pp. 951-964, doi: 10.1109/36.841977.

* cited by examiner

Different applications of Hybrid Compact Polarimetric
GNSS Receivers: Navigation (left) and Reflectometry (right)

200

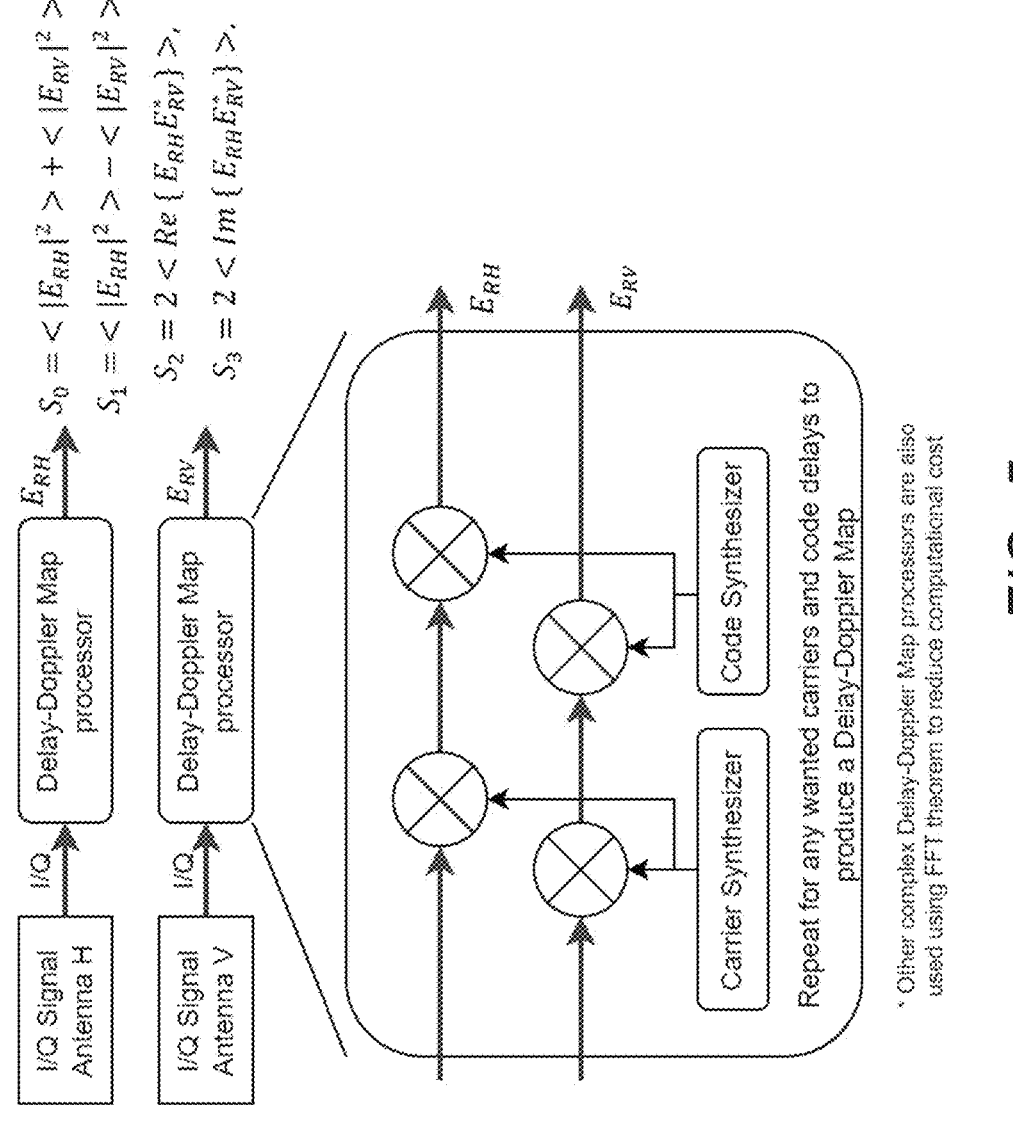

GNSS-R Receiver $$S_0 = \ <|E_{RH}|^2> + <|E_{RV}|^2>,$$
$$S_1 = \ <|E_{RH}|^2> - <|E_{RV}|^2>,$$
$$S_2 = 2 < Re\ \{E_{RH}E_{RV}^*\}>,$$
$$S_3 = 2 < Im\ \{E_{RH}E_{RV}^*\}>,$$

I/Q Signal Antenna H

I/Q Signal Antenna V

Delay-Doppler Map processor

Delay-Doppler Map processor $E_{RH}$ $E_{RV}$ $E_{RH}$ $E_{RV}$

Carrier Synthesizer

Code Synthesizer

Repeat for any wanted carriers and code delays to produce a Delay-Doppler Map

* Other complex Delay-Doppler Map processors are also used using FFT theorem to reduce computational cost

*FIG. 5*

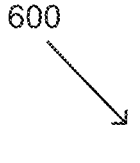
600
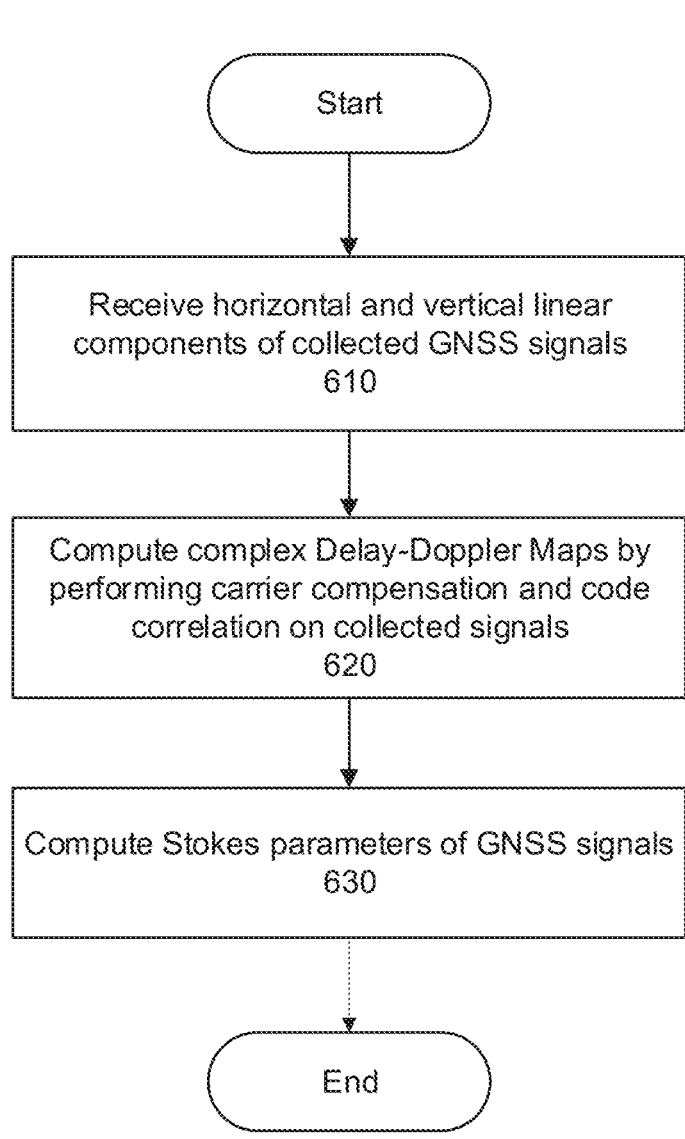
Start
Receive horizontal and vertical linear
components of collected GNSS signals
610
Compute complex Delay-Doppler Maps by
performing carrier compensation and code
correlation on collected signals
620
Compute Stokes parameters of GNSS signals
630
End
*FIG. 6*

SYSTEMS AND METHODS FOR A GLOBAL POSITIONING SYSTEM USING GNSS SIGNALS AND STOKES PARAMETERS

CROSS-REFERENCE TO RELATED APPLICATIONS

The current application claims the benefit of and priority under 35 U.S.C. § 119(e) to U.S. Provisional Patent Application No. 63/417,115 filed Oct. 18, 2022, the disclosure of which is incorporated herein by reference in its entirety for all purposes.

STATEMENT OF FEDERAL SUPPORT

This invention was made with government support under Grant No. 80NMO0018D0004 awarded by NASA (JPL). The government has certain rights in the invention.

FIELD OF THE INVENTION

The present invention generally relates to satellite navigation and, more specifically, navigation and remote sensing using Global Navigation Satellite System (GNSS).

BACKGROUND

Navigation is the process of determining the position and direction of a vehicle or object in motion. It has been an essential part of human history, from the early days of seafaring to the modern era of space exploration. Navigation is achieved through the use of various methods, including celestial navigation, radio navigation, and satellite navigation. Satellite navigation, in particular, refers to the use of orbiting satellites as reference points to determine the precise location and movement of objects on the Earth's surface or in space. One of the most widely used navigation systems is the Global Positioning System (GPS), which uses a network of satellites to provide positioning, navigation, and timing information to users worldwide. Other navigation satellite systems similar to GPS are Galileo (E.U.), BEIDOU (China), GLONASS (Russian Federation), among others, all these systems are known as Global Navigation Satellite System (GNSS). GPS, and GNSS in general, has become an essential tool for a variety of industries, including aviation, maritime, transportation, and emergency services, among others. With the growing demand for accurate and reliable navigation, there is an ongoing need to improve GPS technologies and explore new approaches to satellite navigation. GNSS systems enable a wide range of applications, from guiding a car to a destination to tracking the movement of ships, aircraft, and even humans.

SUMMARY OF THE INVENTION

Systems and methods for a global positioning system using GNSS Signals and Stokes Parameters in accordance with embodiments of the invention are illustrated. One embodiment includes a Global Navigation Satellite System (GNSS) using GNSS signals. The system includes at least four satellites and a receiver. Each satellite further includes at least one pair of antennas, and a transmitter configured to transmit GNSS positioning signals to a receiver. The receiver further includes a memory containing a positioning application, and a processor comprising a set of one or more processors, wherein the positioning application configures the set of one or more processors to determine a position of the receiver by performing the steps of collecting horizontal and vertical linear components of transmitted GNSS positioning signals, computing Stokes parameters of collected GNSS signals, obtaining tuning parameters based on computed Stokes parameters, synthesizing new polarization signal using tuning parameters, and processing new polarization signal to obtain a position of the location.

In a further embodiment, the at least one pair of antennas is a pair of orthogonally polarized antennas.

In still another embodiment, one antenna of the pair of antennas measures horizontal components of the reflected signals, and the other antenna of the pair of antennas measures vertical components of the reflected signals.

In a still further embodiment, the transmitted signal is right hand circularly polarized.

In yet another embodiment, the receiver measures multipath quality of the transmitted signals.

In a yet further embodiment, the receiver eliminates reflected signals from a satellite from being further processed if the multipath quality is below a threshold, and the receiver collected reflected signals from sufficient satellites to perform positioning.

In another additional embodiment, wherein the third Stokes parameter undergoes a constrained maximization process to force the magnitude of the third Stokes parameter to be close to 1.

In a further additional embodiment, the tuning parameters are obtained by multiplying Mueller matrices with computed Stokes parameters.

In another embodiment again, the new polarization signals are synthesized in real time using new signals collected by the antennas.

In a further embodiment again, the new polarization signals are selected from direct signals to minimize multipath.

In still yet another embodiment, the constrained maximization process is performed periodically.

In still another additional embodiment, the first Stokes parameter is the sum of incoherently integrated DDMs of X and Y polarization channels of the received signal.

In a still further additional embodiment, the second Stokes parameter is the difference of incoherently integrated DDMs of X and Y polarization channels of the received signal.

In still another embodiment again, the third Stokes parameter is the real part of the cross-correlation between X and Y polarization channels of the received signal.

In a yet further additional embodiment, the fourth Stokes parameter is the imaginary part of the cross-correlation between X and Y polarization channels of the received signal.

One embodiment includes a Global Navigation Satellite System (GNSS) receiver. The receiver includes at least one pair of antennas is a pair of orthogonally polarized antennas, a memory containing a positioning application, and a processor comprising a set of one or more processors, wherein the positioning application configures the set of one or more processors to determine a position of the receiver by performing the steps of collecting horizontal and vertical linear components of transmitted GNSS positioning signals, computing Stokes parameters of collected GNSS signals, obtaining tuning parameters based on computed Stokes parameters, synthesizing new polarization signal using tuning parameters, and processing new polarization signal to obtain a position of the location.

One embodiment includes an Earth observation system using GNSS signals. The system includes at least one transmitting satellite and at least one receiving satellite. The transmitting satellite includes at least one pair of orthogonally linear polarized antennas, and a transmitter, configured to transmit GNSS positioning signals to a location. The receiving satellite includes at least one pair of orthogonally linear polarized antennas, a memory containing a positioning application, and a processor comprising a set of one or more processors, wherein the positioning application configures the set of one or more processors to measure properties of the location by performing the steps of collecting horizontal and vertical linear components of transmitted GNSS positioning signals reflected off of the location, computing Stokes parameters of collected GNSS signals, and measuring a plurality of properties of the location based on the Stokes parameters.

In yet another embodiment again, the receiving satellite is a GNSS-R satellite.

In a yet further embodiment again, the GNSS-R receiver comprises a ground-based receiver device and an aircraft-equipped receiver.

In another additional embodiment again, the Stokes parameters are computed by capturing horizontal and vertical linear components of the collected GNSS signal, generating Delay-Doppler Maps (DDMs) based on the collected signals, and computing Stokes parameters based on scattering coefficients of collected signals.

In a further additional embodiment again, the Stokes parameters are computed after correlation is performed and complex DDMs are obtained.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 5 illustrates a GNSS Reflectometry (GNSS-R) receiver incorporating Delayed Doppler Map (DDM) processors in accordance with an embodiment of the invention.

FIG. 6 illustrates a process for computing Stokes parameters for GNSS-R in accordance with an embodiment of the invention.

DETAILED DESCRIPTION

Figure 1:
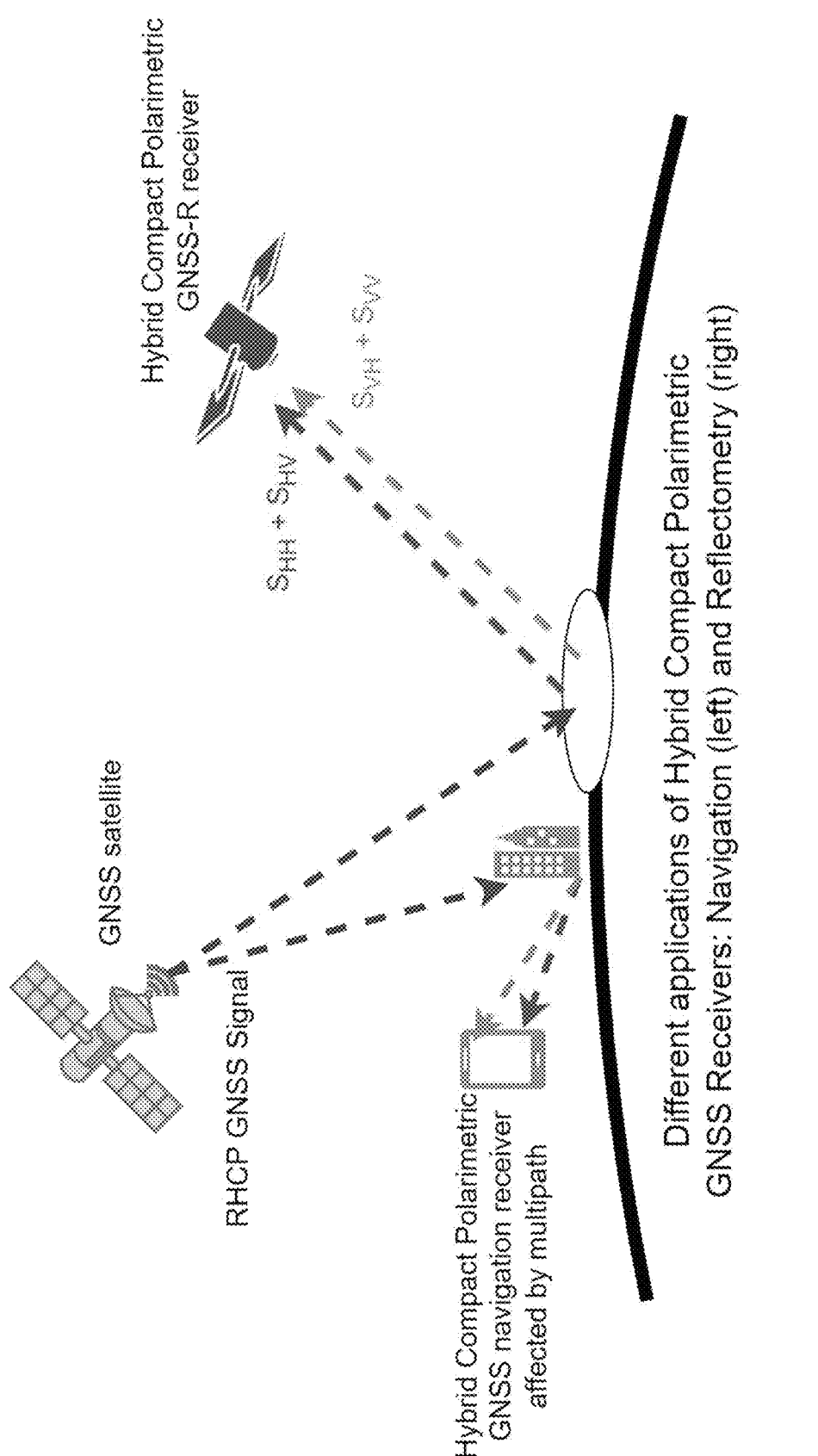
FIG. 1 illustrates a Hybrid Compact Polarimetry (HCP) signal transmission process between Global Navigation Satellite System (GNSS) satellites and receivers in accordance with an embodiment of the invention.

Global Navigation Satellite System (GNSS) is a very powerful and accurate navigation system. It uses a network of satellites orbiting the Earth to transmit radio signals. GNSS receivers measure the time it takes for these radio signals to reach them and use this information to calculate their position. GNSS systems have become more prevalent, with applications in devices that are being used every day, such as automobiles and mobile phones.

In current GNSS systems, positioning signals travel by line of sight from satellites to receivers. If a GNSS receiver is not placed in the line of sight to at least four satellites, the accuracy of positioning may be affected. The nature of how GNSS signals are transmitted can introduce a number of limitations that may hinder theft accuracy and effectiveness. GNSS signals are typically made up of radio waves, so they can be blocked or weakened by obstacles such as buildings, trees, and mountains. In urban areas with more high-rise buildings or in areas with dense vegetation, GNSS can sometimes be unreliable. GNSS signals can be delayed or refracted by atmospheric conditions such as ionospheric storms and solar flares. GNSS receivers can be susceptible to interference from other electronic devices, such as cell phones and power lines. Factors such as interference and excessive multipath can affect the performance of the receivers and render them ineffective. Though satellite systems do not often fail, a failure in GNSS constellations can also render GNSS receivers ineffective. All these factors can reduce the accuracy of GNSS positioning.

These limitations call for improvements to enhance current GNSS systems to better adjust to the environment of today's world. Hybrid Compact Polarimetric (HCP) GNSS thus emerges as a promising new approach to satellite navigation that has the potential to significantly enhance the accuracy and reliability of positioning, navigation, and timing information. Instead of processing received radio waves transmitted from satellites to GNSS receivers through the line of sight, HCP GNSS systems are able to more accurately calibrate and process GNSS signals through a polarimetric approach. HCP GNSS can offer several advantages over traditional GNSS systems, such as the ability to operate in urban canyons, forests, and other environments where direct line of sight to GNSS satellites is obstructed. However, HCP GNSS signals and traditional GNSS signals operate in different ways. This can make it challenging to utilize HCP GNSS technologies in current positioning systems, as most current positioning systems would not know how to process HCP GNSS signals.

Systems and methods in accordance with many embodiments of the invention can attempt to remedy the above limitations by providing systems that can process GNSS signals and utilize the calibrated signals for improved positioning and localization. In many embodiments, systems leverage the polarimetric processing approach of HCP to measure multipaths of GNSS signals and calibrate the GNSS signals based on the measurements. Multipaths of signals can affect the signals' propagation, and in the context of positioning signals, multipaths can ultimately lead to inaccurate positioning. In several embodiments, systems can utilize the measurements to mitigate or eliminate multipath and provide a more accurate and precise positioning. In numerous embodiments, systems can modify GNSS receivers to be able to receive HCP GNSS signals for positioning. In several embodiments, systems can extract Stokes parameters out of GNSS signals and synthesize signals based on the extracted parameters that can be processed by current conventional GNSS receivers.

Additionally, since HCP GNSS technology benefits from the presence of signal reflections caused by the environment that change the polarization of the GNSS signal, HCP GNSS can also be used for Earth Observation purposes in order to analyze Earth's surface in a configuration known as GNSS-Reflectometry (GNSS-R). In numerous embodiments, systems can extract Stokes parameters and other relevant information of reflected GNSS signals to analyze the environmental parameters of Earth. HCP GNSS-R can provide valuable information on soil moisture, vegetation cover, soil surface roughness, frozen and thawed states of the landscapes, flooding, wetlands and other land water bodies dynamics, ocean wind speed, ocean wave height, presence of algae and oil surfactants on the ocean surface, sea ice presence, concentration, thickness and types. This makes HCP GNSS-R useful for a wide range of scientific and commercial applications, such as weather forecasting, maritime navigation, and climate change research.

Hybrid Compact Polarimetry (HCP)

HCP is a technique for measuring the polarization of electromagnetic waves using a single transmit polarization and two orthogonal receive polarizations. HCP can be achieved by using a circularly polarized transmit signal and two linearly polarized receive signals. The two receive signals may be picked up by orthogonally polarized linear antennas, which can allow for the reconstruction of the full Stokes vector of the transmitted signal. The Stokes vector is a four-dimensional vector that contains Stokes parameters, which can be processed to describe the polarization state of an electromagnetic wave.

FIG. 1 illustrates a Hybrid Compact Polarimetry (HCP) signal transmission process between Global Navigation Satellite System (GNSS) satellites and receivers in accordance with an embodiment of the invention. In many embodiments, systems include transmitters to transmit right-hand circular polarization (RHCP) signals to a point on a surface. Transmitters may be GNSS satellites. Transmitted GNSS signals may be reflected off of surfaces in the transmission environment, and the polarization of reflected GNSS signals may change depending on different surface scattering properties. The horizontal and vertical components of the transmitted RHCP signals may interact with the co-polarized ($S_{XX}$) and cross-polarized ($S_{XY}$) surface scattering components. Reflected signals may become a combination of polarizations after interacting with various surface scattering components. For example, in an ideal case where the reflecting surface is a flat specular surface, the RHCP transmitted signal can become a left-hand circular polarization (LHCP) signal after reflection.

In numerous embodiments of the invention, systems include receivers that can pick up both direct GNSS signals and reflected GNSS signals. GNSS signals may be affected by multipath, which needs to be accounted for at the receiver. In many embodiments of the invention, receivers can be a dual linear polarization receiver capable of picking up horizontal and vertical components of GNSS signals. Receivers may include at least two orthogonally polarized linear antennas, where one antenna may be a horizontal antenna (H) configured to pick up the horizontal components of GNSS signals, and one antenna may be a vertical antenna (V) configured to pick up the vertical components of GNSS signals.

Transmitted signals may be scattered in multiple directions upon contact with various surfaces. In a forward-scattering alignment scenario (FSA), the received signal by each of the H and V antennas can be expressed as $$E_{RX} = \begin{bmatrix} E_{RH} \\ E_{RV} \end{bmatrix} = G(r) \cdot S \cdot E_{TX} = \frac{e^{-jkr}}{kr} \cdot \begin{bmatrix} S_{HH} & S_{HV} \\ S_{VH} & S_{VV} \end{bmatrix} \cdot \begin{bmatrix} \frac{1}{\sqrt{2}} \\ -\frac{j}{\sqrt{2}} \end{bmatrix} \quad (1)$$

$$E_{RH} = G(r) \cdot \left( \frac{S_{HH}}{\sqrt{2}} - \frac{jS_{HV}}{\sqrt{2}} \right)$$

$$E_{RV} = G(r) \cdot \left( \frac{S_{VH}}{\sqrt{2}} - \frac{jS_{VV}}{\sqrt{2}} \right)$$

where $E_{RH}$ and $E_{RV}$ are the RHCP signals scattered over the ground and collected by a pair of H and V linearly polarized antennas, $S_{XX}$ are the scattering coefficients for a Forward-Scattering Alignment (FSA) in the Jones basis, $$E_{TX} = \frac{1}{\sqrt{2}} [1, -j]^T$$

is the Jones representation of the transmitted RHCP in Jones basis.

$$G(r) = \frac{e^{-jkr}}{kr}$$

is the spherical wave factor, k is the wavenumber, r is the distance traveled by the wave at each scattering point target, and S is the Sinclair scattering matrix.

In many embodiments, Sinclair scattering coefficients can be expressed either in FSA or Back-Scattering Alignment (BSA) configuration. Sinclair scattering coefficients in both configurations can be related by:

$$S_{FSA} = \begin{bmatrix} S_{HH} & S_{HV} \\ S_{VH} & S_{VV} \end{bmatrix}, \quad (2)$$

$$S_{FSA} = \begin{bmatrix} 1 & 0 \\ 0 & -1 \end{bmatrix} \cdot S_{BSA},$$

$$S_{BSA} = \begin{bmatrix} S_{HH} & S_{HV} \\ -S_{VH} & -S_{VV} \end{bmatrix}.$$

Equation 2 illustrates an example of polarization change in the vertical direction in a perfect reflector where the horizontal and vertical scattering coefficients are 1 and the cross-polarization components are 0. Due to the forward-scattering scenario, RHCP signals can turn into LHCP signals upon reflection in GNSS-R systems. Received signal may become:

US 12,644,993 B2

7

$$E_{RX} = G(r) \cdot S_{FSA} \cdot E_{TX} = G(r)\begin{bmatrix} 1 & 0 \\ 0 & -1 \end{bmatrix} \cdot \frac{1}{\sqrt{2}}\begin{bmatrix} 1 \\ -j \end{bmatrix} = \frac{e^{-jkr}}{kr} \cdot \frac{1}{\sqrt{2}}\begin{bmatrix} 1 \\ j \end{bmatrix} \quad (3)$$

where $$\frac{1}{\sqrt{2}}[1, j]^T$$

is the Jones representation of the received LHCP signal for an ideal reflector, and $$\frac{e^{-jkr}}{kr}$$

is the spherical wave factor, introduced in Equation 1.

The received GNSS reflected signal illustrated in Equations 1-3 represents the case of a finite target response. In situations where a distributed target such as the Earth's surface is involved, the scattering matrix S in Equation 1 may depend on the reflection geometry and the receiver parameters, making surface parameter retrieval a complex task.

Assuming that cross-polarization terms are negligible, coherence matrices for a distributed target can be obtained in Equations 6 using normalized Sinclair coefficients in Equations 4 and 5 below.

$$C = E_{RX}E_{RX}^* = \begin{bmatrix} E_{RH} \\ E_{RV} \end{bmatrix}[E_{RH}^* \quad E_{RV}^*] \quad (4)$$

$$C = \begin{bmatrix} \langle E_{RH}E_{RH}^* \rangle & \langle E_{RH}E_{RV}^* \rangle \\ \langle E_{RV}E_{RH}^* \rangle & \langle E_{RV}E_{RV}^* \rangle \end{bmatrix}$$

$$C = \frac{1}{2}\begin{bmatrix} |S_{HH}|^2 & -(S_{HH}S_{VH} + S_{HV}S_{VV}) \\ -(S_{VH}S_{HH} + S_{VV}S_{HV}) & |S_{VV}|^2 \end{bmatrix} + $$

$$\frac{1}{2}\begin{bmatrix} |S_{HV}|^2 & -j(S_{HH}S_{VV} - S_{HV}S_{VH}) \\ -j(S_{VH}S_{HV} - S_{VV}S_{HH}) & |S_{VH}|^2 \end{bmatrix}$$

A common way to express the coherence matrix C is by building the Stokes parameters of the received signal as:

$$S_0 = <|E_{RH}|^2> + <|E_{RV}|^2> \quad (5)$$
$$S_1 = <|E_{RH}|^2> - <|E_{RV}|^2>,$$
$$S_2 = 2 < \text{Re}\{E_{RH}E_{RV}^*\}>,$$
$$S_3 = 2 < \text{Im}\{E_{RH}E_{RV}^*\}>,$$

where the < > operator is the average operator. In GNSS systems, the modulus square and the < > operation are known as "integrate and dump" or "incoherent integration". Incoherent integration is a technique that discards the phase information of received signals and adds up only the magnitude or power of the signals. This means that only the amplitude of the signal is considered in the integration process. Note that, $S_3$ is defined in a way that a LHCP shows a negative $S_3$ in contrast to RHCP. Finally, C can be written as a linear combination of the Stokes parameters:

8

$$C = \frac{1}{2}\begin{bmatrix} S_0 + S_1 & S_2 + jS_3 \\ S_2 - jS_3 & S_0 - S_1 \end{bmatrix} \quad (6)$$

Here, $\text{Re}\{C_{12}\}=\text{Re}\{C_{21}\}$, and $\text{Im}\{C_{12}\}=-\text{Im}\{C_{21}\}$, then $$\text{Re}\{E_{RH}E_{RV}^*\} = \text{Re}\{E_{RV}E_{RH}^*\},$$

and $$\text{Im}\{E_{RH}E_{RV}^*\} = -\text{Im}\{E_{RV}E_{RH}^*\}.$$

Re{ ... } and Im{ ... } are the real and imaginary parts of the complex signal. In several embodiments, $S_{XX}$ are the normalized Sinclair scattering coefficients from Equation 1.

Stokes parameters can also be computed from circular polarization antennas by:

$$S_0 = \langle |E_{RR}|^2 \rangle + \langle |E_{RL}|^2 \rangle \quad (7)$$
$$S_1 = 2\langle \text{Im}\{E_{RR}E_{RL}^*\} \rangle$$
$$S_2 = 2\langle \text{Re}\{E_{RR}E_{RL}^*\} \rangle$$
$$S_3 = \langle |E_{RR}|^2 \rangle - \langle |E_{RL}|^2 \rangle$$

where $E_{RR}$ and $E_{RL}$ are the RHCP and LHCP components of the scattered RHCP signal transmitted by the GNSS transmitters or satellites. Therefore, once the Stokes parameters of the received signal are computed, and according to Equation 7, $|E_{RR}|^2$, $|E_{RL}|^2$, $|E_{RH}|^2$, or $|E_{RV}|^2$ can be computed by linearly combining the first and fourth Stokes parameters.

Calibrating GNSS Signals for Positioning Using Stokes Parameters

In many embodiments, GNSS satellites transmit positioning signals in RHCP polarization. Typically, this means that antennas on GNSS receivers are orthogonally polarized linear antennas that can be configured to measure in RHCP as well. Therefore, for conventional GNSS receivers that are generally not equipped with such linear antennas, GNSS signals, which may be affected by multipaths, need to be calibrated before they can be processed. When there is an absence of a clear line of sight, such as in urban environments or under forests, transmitted signals may bounce off of multiple surfaces and create multipath. The polarization of multipath signals can change depending on the surfaces where reflections are produced. If the direct signal is RHCP, then the reflected signal may become LHCP or a random polarization. Multipaths can increase the uncertainty in determining the positioning of the receiver and should be reduced as much as possible to achieve precise positioning.

Figure 2:
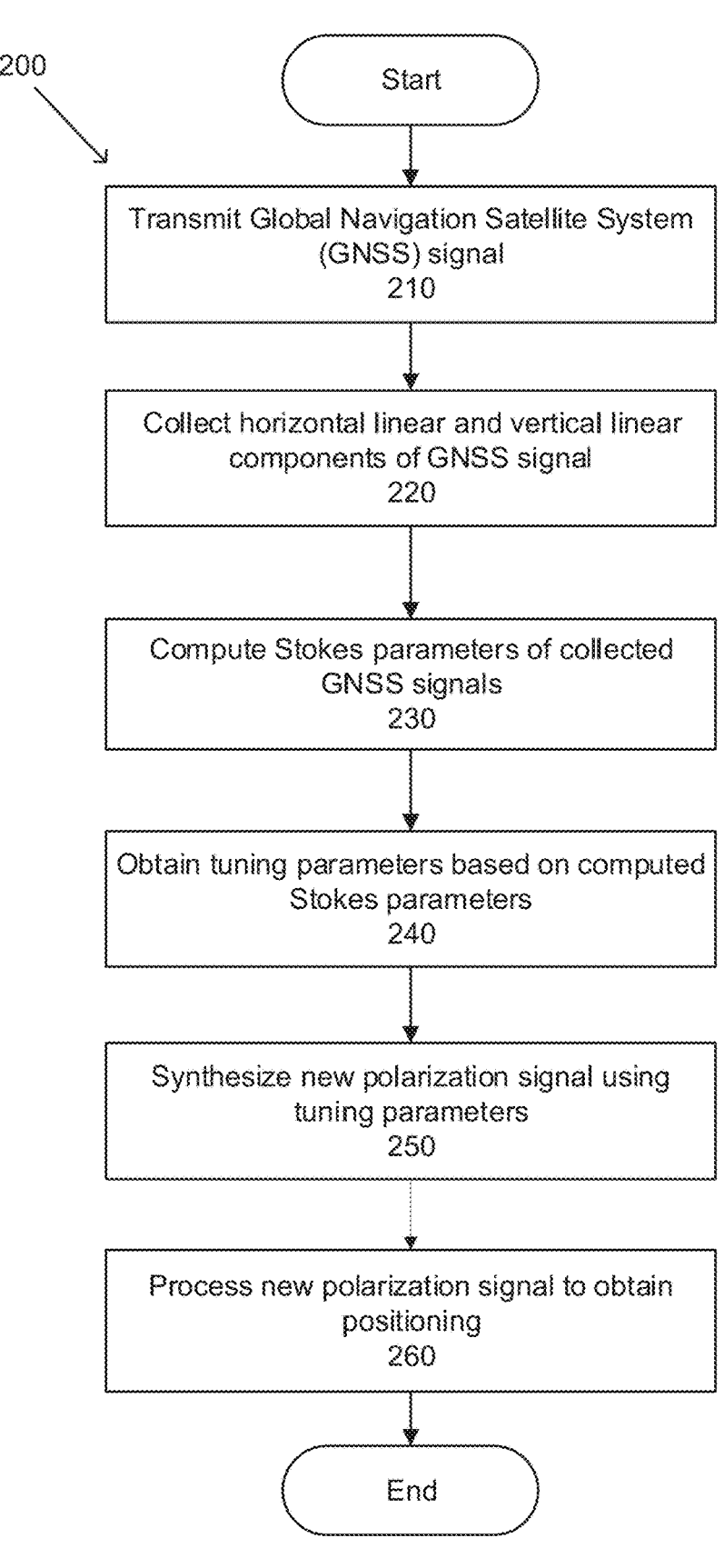
FIG. 2 illustrates a process of calibrating GNSS signals for processing in accordance with an embodiment of the invention.

Stokes parameters can provide an opportunity to measure the quantity of multipath and a way to minimize it by optimizing the polarization synthesis basis. FIG. 2 illustrates a process of calibrating GNSS signals for processing in accordance with an embodiment of the invention. Process 200 transmits (210) Global Navigation Satellite System (GNSS) signals. In numerous embodiments, transmitted signals are RHCP signals.

Process 200 collects (220) horizontal linear and vertical linear components of GNSS signals. In several embodiments, the collected signals are electrical signals. The collected signals may be acquired by orthogonally linear polarized antennas on GNSS receivers.

Process 200 computes (230) Stokes parameters of collected GNSS signals. Stokes parameters may be calculated as described above. In several embodiments, normalized parameters are obtained by dividing all values by the first Stokes parameter ($S_0$). In numerous embodiments, steps 210 to 230 can be applied to other types of GNSS receivers that collect reflected GNSS signals for processing in GNSS-R receivers.

In numerous embodiments, computed Stokes parameters can be used to assess the multipath quality of transmitted signals. For reflected signals to not have multipath, the normalized $S_3$ must be close to +1 while the normalized $S_1$ and $S_2$ have to be close to 0. Any deviation from this rule may indicate the presence of multipath. This information could be used to ruggedize the estimation of the positioning, e.g., if reflected signals collected are transmitted from a transmitter/satellite having Stokes parameters that indicate a heavy presence of multipath, said transmitter/satellite could be excluded from the positioning estimation, assuming that there are enough satellites left to still perform the positioning estimation.

Process 200 obtains (240) tuning parameters based on computed Stokes parameters. In numerous embodiments, Mueller matrices are computed and multiplied to computed Stokes parameters. Multiplying Stokes parameters with Mueller matrices can correct transmitter and receiver non-idealities. In selected embodiments, $S_3$ undergoes a process of constrained maximization, with the goal of setting it up to 1 while keeping $S_1$ and $S_2$ close to 0.

Process 200 synthesizes (250) new polarization signals using obtained tuning parameters. In many embodiments, new polarization signals are synthesized using signals captured by the orthogonally linear polarized antenna in real-time. The new polarization signal can be synthesized by:

$$E_{optimized} = \left(E_H - \delta_1 e^{-j\phi_{xy}} E_V\right) + je^{-j\phi_{xy}}\left(\frac{1}{m}E_V - \delta_2 E_H\right) \quad (9)$$

An optimized polarization basis can minimize the multipath since the basis is designed to select only the direct signal while minimizing the reflected signals.

Process 200 processes (260) new polarization signals to obtain positioning. In numerous embodiments, new polarization signals are sent to regular GNSS receivers for processing. Constrained maximization of $S_3$ can be periodically performed to update the polarization synthesis such that the polarization basis is optimal at each time. This can be executed for each transmitter/satellite channel.

While specific processes for calibrating GNSS signals for processing are described above, any of a variety of processes can be used to calibrate GNSS signals for processing as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 3:
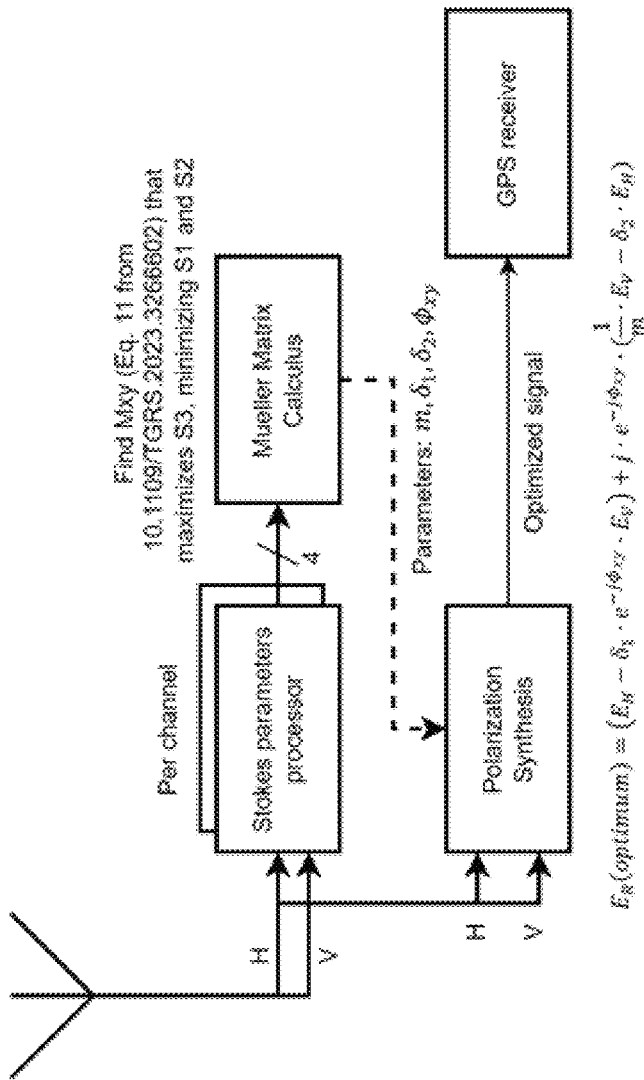
FIG. 3 illustrates a block diagram of a system architecture of a GNSS receiver configured to retrieve Stokes parameters to mitigate multipath in GNSS signals in accordance with an embodiment of the invention.

FIG. 3 illustrates a block diagram of a system architecture of a GNSS receiver configured to retrieve Stokes parameters to mitigate multipath in GNSS signals in accordance with an embodiment of the invention. In many embodiments, systems include one Stokes parameter processor for each transmitter/satellite in the system. Systems can generate optimized signals by mixing collected H and V components with tuning parameters m, $\delta_1$, $\delta_2$, $\phi_{xy}$. Optimized signals can be sent to GPS receivers to be processed and localized.

Figure 4:
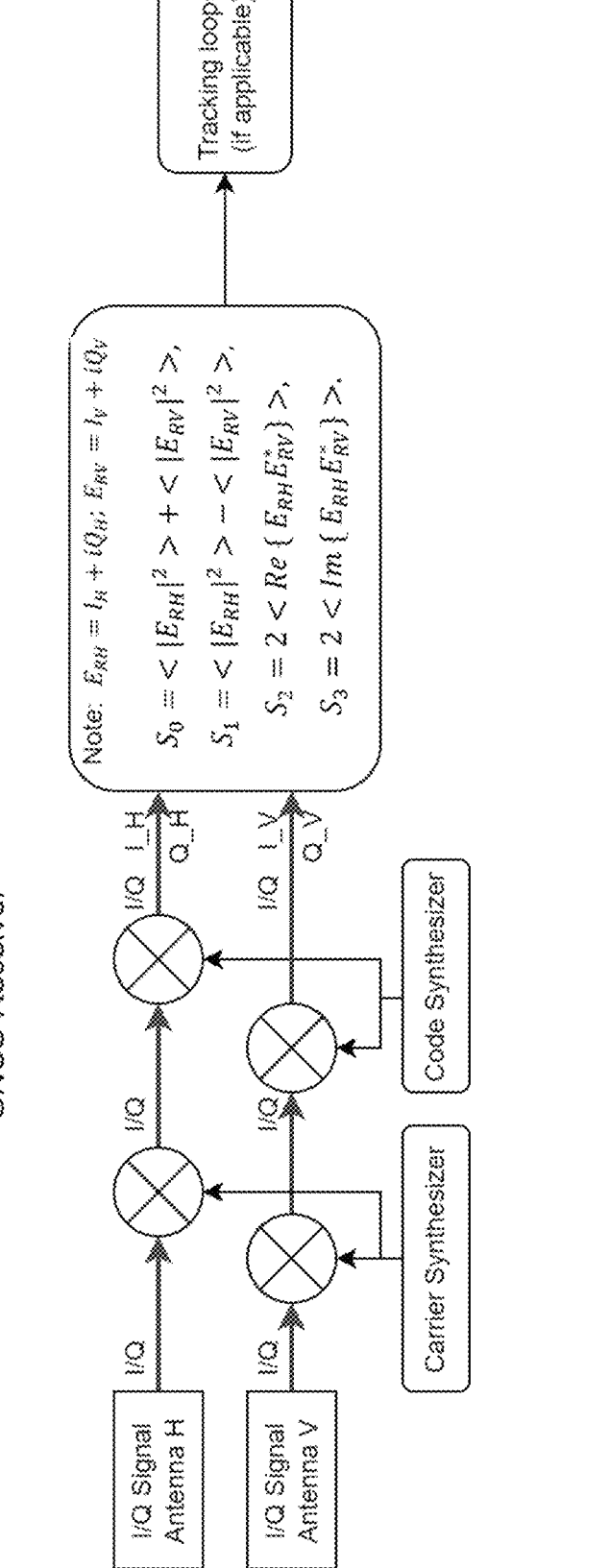
FIG. 4 illustrates a general scheme for computing Stokes parameters for conventional GNSS receivers to process any GNSS signal in accordance with an embodiment of the invention.

FIG. 4 illustrates a general scheme for computing Stokes parameters for conventional GNSS receivers to process any GNSS signal in accordance with an embodiment of the invention. In many embodiments, the first and second Stokes parameters are the sum and difference, respectively, of the incoherently integrated I/O data for N samples of the H and V channels. The third and fourth Stokes parameters may be the averages of the real and imaginary parts, respectively, of the cross-correlation between the H and V complex signal. In selected embodiments, systems computing Stokes parameters take into account the modulation of the GNSS bands that are used for the GNSS signals. In some embodiments, since the sign of the transmitted navigation bit is the same for the H and V channels, the navigation bit phase may not need to be processed, even considering the cross-correlation for complex signals.

FIG. 5 illustrates a GNSS-R receiver incorporating DDM processors in accordance with an embodiment of the invention. In many embodiments, DDM processors can be used to generate DDMs of GNSS-R signals. GPS orbits are propagated, and based on satellite position, velocity, and time (PVT), the specular reflection point that falls within the antenna beamwidth can be retrieved.

Although a specific example of a GNSS-R receiver is illustrated in this figure, any of a variety of DDM processors can be utilized to generate DDMs for GNSS-R signals similar to those described herein as appropriate to the requirements of specific applications in accordance with embodiments of the invention.

Computing Stokes Parameters in GNSS-R

Stokes parameters can be used to fully describe the polarimetric properties of a signal. In the synthetic aperture radar (SAR) case, Stokes parameters are usually computed after range and azimuth compression, and single look complex (SLC) images are post-processed as shown in Equation 5 or 7, depending on the polarizations used in the transmitter/receiver chain. In many embodiments, Stokes parameters of GNSS-R signals may be computed using the complex signal after correlation is performed and complex Delay-Doppler Maps (DDM) are obtained. DDMs can measure both the delay that a reflected signal takes to get to the receiver and the Doppler (frequency) shift of that signal.

FIG. 6 illustrates a process for computing Stokes parameters for GNSS Reflectometry (GNSS-R) in accordance with an embodiment of the invention. Process 600 receives (610) horizontal and vertical linear components of the collected GNSS signals. In several embodiments, the collected GNSS signals are reflected off of surfaces in the transmission environment. In numerous embodiments, horizontal and vertical linear components are calibrated based on factors including, but not limited to, antenna polarization alignment, Faraday rotation, and transmitter and receiver non-idealities.

Process 600 computes (620) complex Delay-Doppler Maps by performing carrier compensation and code correlation on collected signals. Process 600 computes (630) Stokes parameters of collected GNSS signals. In many embodiments, systems can perform Doppler and range compensation on the horizontal and vertical I/O signals before incoherent integration to obtain Stokes parameters, as described in FIGS. 5 and 6. The process of computing Stokes parameters in GNSS-R signals will be discussed in detail further below.

While specific processes for computing Stokes parameters in GNSS-R signals are described above, any of a variety of processes can be utilized to compute Stokes parameters as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Computing Stokes Parameters Accounting for GNSS Modulation

In some embodiments, DDMs of data collected in some GNSS modulations can be generated using two orthogonal codes of different lengths. For example, in the GPS L2C band, the two orthogonal codes are the Civil-Moderate (CM) code and the Civil-Long (CL) code. In numerous embodiments of the invention, if DDM processing is not properly handled, it can result in degraded signal-to-noise ratio (SNR) and code resolution.

Figure 7:
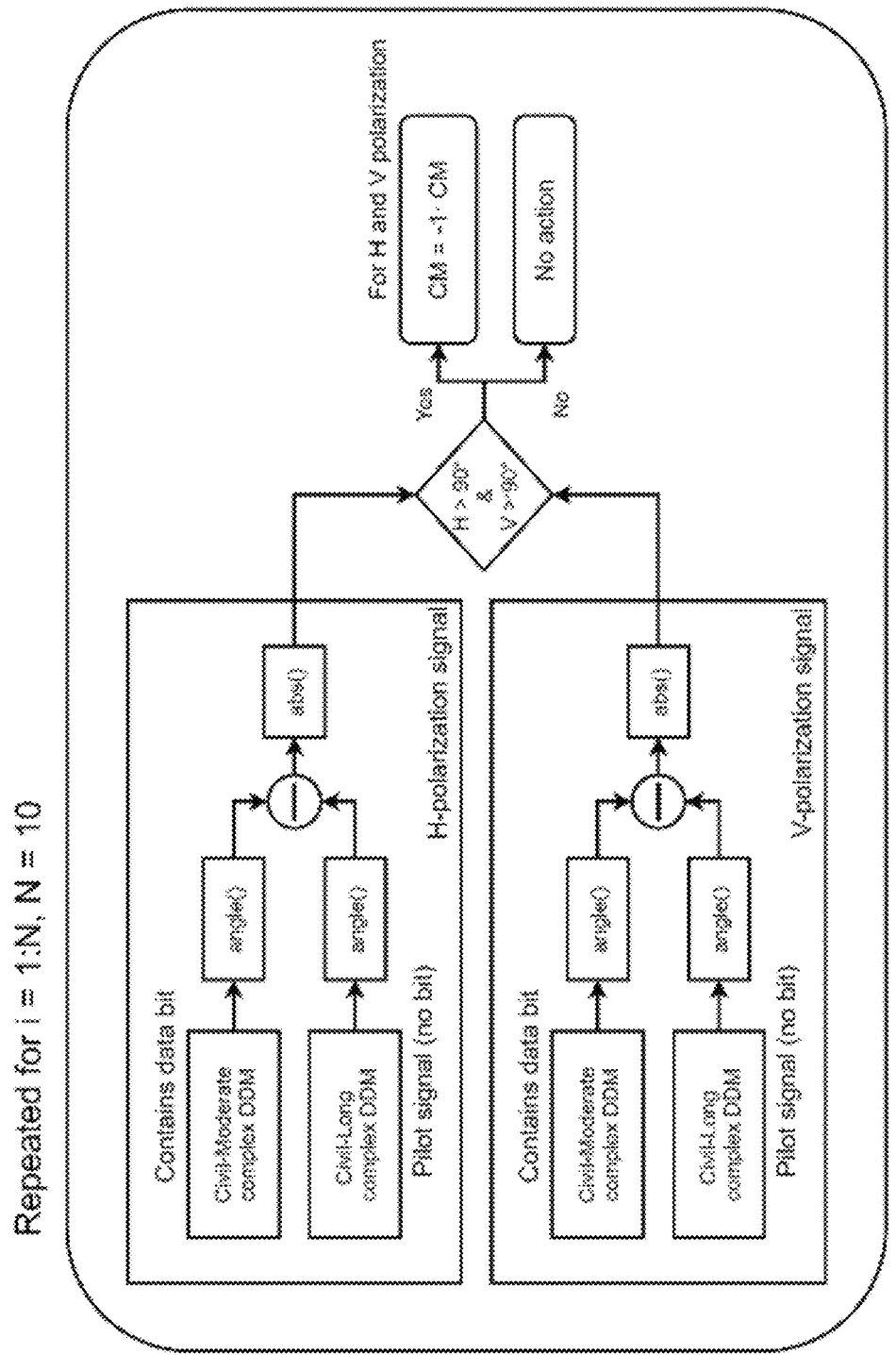
FIG. 7 illustrates a scheme for processing DDMs in L2C band in accordance with an embodiment of the invention.

Focusing on the L2C band, in several embodiments, L2C DDMs can be built to incoherently average the CM and CL codes. However, as incoherent averaging removes phase information, cross-correlation between $E_{RH}$ and $E_{RV}$ may be unable to be performed without complex signals, meaning that the third and fourth Stokes parameters cannot be computed. Therefore, to perform coherent addition of the CM and CL codes, the bit phase must be compensated FIG. 7 illustrates a scheme for processing DDMs in L2C band in accordance with an embodiment of the invention. In numerous embodiments, bit phases are retrieved by looking at phase differences between the CM and CL codes. CM codes contain navigation bit information, while the CL codes are pilot signals with no phase information. Complex DDMs can be computed by adding the compensated CM code and the CL code. If the bit transition is not properly handled, the coherent addition of CM and CL can produce a noisy output.

Receiver Phase Offset Estimation and Calibration

Even if the orthogonally linear polarized antennas on GNSS receivers are perfectly aligned, the receivers themselves may not present a perfect alignment. Circumstances such as slightly different cable lengths, intrinsic phase offsets in the antenna disposition, or differential phase offsets in the H and V channels may impact the actual phase measurement between the channels. This phase offset can be estimated and corrected before computing the final Stokes parameters. The third and fourth Stokes parameters in Equation 5 can be written as:

$$S_2 = \langle 2|E_{RH}| \cdot |E_{RV}| \cdot \cos(\delta) \rangle \quad (11)$$

$$S_3 = \langle 2|E_{RH}| \cdot |E_{RV}| \cdot \sin(\delta) \rangle$$

-continued $$\delta = a\tan2(S_3, S_2)$$

Phase ($\delta$) can be computed as shown in Equation 11 using the third ($S_2$) and fourth ($S_3$) Stokes parameters computed from Equation 5. $\delta$ may be defined as negative to preserve the $S_3$ convention of being negative for LHCP signals. After phase offset calibration, the four Stokes DDMs can be computed using Equations 5 and 10 and subtracting the appropriate phase offset.

Calibrating HCP GNSS-R Signals for Earth Observation

As discussed above, HCP GNSS signals can be used for environmental observation purposes. In many embodiments, systems may include HCP GNSS-R receivers capable of processing GNSS signals reflected off of surfaces. GNSS-R receivers can compute the Stokes parameters of reflected signals to obtain environmental information of the surfaces that reflected the GNSS signals. The full-Stokes DDMs can be generated on board a GNSS-R receiver similarly to the generation of DDMs from current GNSS-R missions. Stokes parameters of the reflections can be computed by:

$$S_0 = \langle |E_{RX}(\tau, f_d)|^2 \rangle + \langle |E_{RY}(\tau, f_d)|^2 \rangle \quad (12)$$

$$S_1 = \langle |E_{RX}(\tau, f_d)|^2 \rangle - \langle |E_{RY}(\tau, f_d)|^2 \rangle$$

$$S_2 = 2\langle \mathrm{Re}\{E_{RX}(\tau, f_d)E_{RY}^*(\tau, f_d)\} \rangle$$

$$S_3 = 2\langle \mathrm{Im}\{E_{RX}(\tau, f_d)E_{RY}^*(\tau, f_d)\} \rangle$$

where $E_{RX}$ and $E_{RY}$ are the complex electric fields after cross-correlation with the pseudo-random noise (PRN) replica (i.e., conventional GNSS-R) for each delay $\tau$, and Doppler shift $f_d$, of two linear orthogonal polarimetric components (X and Y) of the RHCP transmitted signal. The < > operator can denote time averaging, Re and Im denote the real and imaginary part of the complex number, and * denotes complex conjugate. Hence, the Stokes parameters are computed from the complex DDMs at the X and Y polarization channels.

In many embodiments, $S_0$ and $S_1$ correspond to the sum and difference of the incoherently integrated DDMs of the X and Y polarization channels, respectively, and $S_2$ and $S_3$ are the averaged Real and Imaginary parts of the complex cross-correlation or multiplication between X and Y polarization channels. In many embodiments, integrals of the DDM within a box of several delays and Doppler around the peak are computed after each Stokes parameter is computed from the DDM. This calculation can produce the surface integrated power across the entire Glistening zone, which is the equivalent of having a single scattering value for all the surface contributions seen in the DDM (assuming Kirchhoff's approximation). Hence, for each Stokes parameter DDM, the surface integral can be computed by:

$$\overline{S}_x = \sum_{\tau, fd} S_x(\tau, f_d) \quad (13)$$

where $S_x$ represents the Stokes parameters {0,1,2,3} from Equation 12.

In some embodiments, Equation 12 can also be defined for a pair of circular antennas with opposite sense, known as $\pi/4$ compact polarimetry or dual circular polarimetry (DCP):

$$S_0 = \langle |E_{RR}(\tau, f_d)|^2 \rangle + \langle |E_{RL}(\tau, f_d)|^2 \rangle \qquad (14)$$

$$S_1 = -2\langle \operatorname{Im}\{E_{RR}(\tau, f_d)E_{RL}^*(\tau, f_d)\}\rangle$$

$$S_2 = 2\langle \operatorname{Re}\{E_{RR}(\tau, f_d)E_{RL}^*(\tau, f_d)\}\rangle$$

$$S_3 = \langle |E_{RR}(\tau, f_d)|^2 \rangle - \langle |E_{RL}(\tau, f_d)|^2 \rangle$$

where $E_{RR}$ and $E_{RL}$ are the complex electric fields of the signals received by a pair of RHCP ($E_{RR}$) and LHCP ($E_{RL}$) antennas. Defining the Stokes parameters as in Equation 12 using linear antennas or as in Equation 14 using circular antennas can allow for a complete reconstruction of the polarimetric scene. The calibration process discussed further below may apply to both cases, receiving in linear or circular polarization.

Effects and non-idealities of received signals can come from various sources. Examples of non-idealities can include transmitted signal axial ratio and phase offset off of a perfect circular wave; two-way Faraday rotation from the transmitter to the specular point and from the specular point to the receiver; polarization misalignment as receiver antenna X/Y planes are usually not aligned with the H/V planes of the surface; and receiver non-idealities such as antenna pattern gain differences between X and Y polarization, receiver phase offset, and antenna cross-polarization component.

GNSS-R transmitted signals are normally assumed to be a perfect circularly polarized wave. However, this is not completely accurate. As defined in the GPS interface control document (ICD), the ellipticity of the transmitted signal is "no worse than 1.8 dB for GPS L1 and 2.2 dB for GPS L2 bands". This means that transmitter non-idealities may occur when one of the two components of the Jones vector composing the wave is slightly larger than the other. Hence, the transmitted wave is elliptical.

Additionally, transmitted signals may experience a two-way Faraday rotation induced by the ionosphere as signals travel their way to the surface's reflection point and on their way to the receiver. Slight phase offsets between the X and Y polarization channels of the transmitted Jones vector may also be present. Further, various receiver-side non-idealities, such as antenna pattern gain differences in X and Y polarizations, phase differences in the receiver path, cross-polarization isolation between X and Y channels, and also the polarization view angle, may need to be calibrated.

Figure 8A:
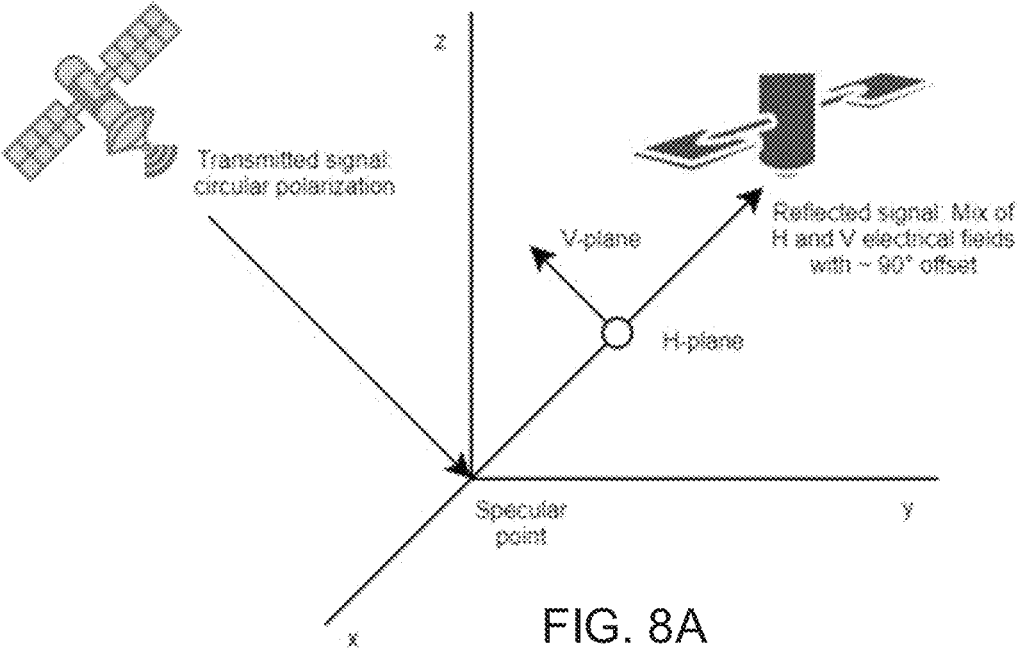
FIGS. 8A-C illustrate bistatic geometry in forward-scatter configuration in accordance with an embodiment of the invention.
Figures 8B, 8C:
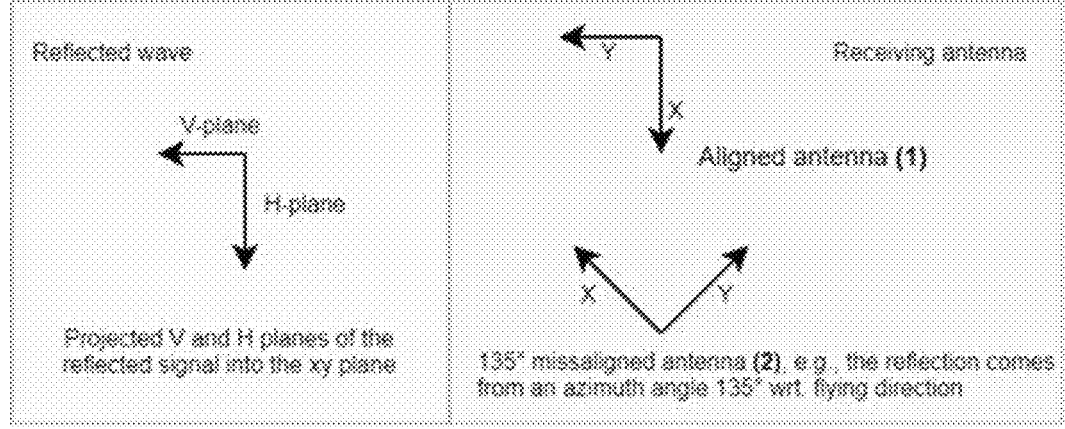

FIGS. 8A-C illustrate bistatic geometry in forward-scatter configuration in accordance with an embodiment of the invention. FIG. 8A illustrates the H and V planes of reflected GNSS signals, and FIGS. 8B-C illustrate examples of aligned received antenna and misaligned polarimetric antenna, respectively, in accordance with an embodiment of the invention. In the example presented in FIGS. 8B-C, if the reflection geometry and the receiving antenna X and Y planes are aligned with the H and V surface plane, such as FIG. 8B, no rotation is required. This may occur in cases such as a conical scanning antenna or if the azimuth angle of the reflection with respect to the flying direction (i.e., where the X and Y planes of the antenna are pointing) are aligned with the surface H and V planes. In FIG. 8C, the flying direction and the reflection azimuth direction are misaligned by 135° clockwise. That means that the X polarization will receive a combination of V and H planes and that both X and Y antennas will receive a combination of H and V planes. In this case, the antennas can be rotated 135° clockwise or 225° counterclockwise. They can be deemed as a pair of 45° antennas, rotated 90° with respect to H/V, receiving the signal.

The received signal by this arbitrary antenna configuration, and considering all possible effects, is therefore defined by:

$$\begin{pmatrix} E_{RX} \\ E_{RY} \end{pmatrix} = A_{rx} \cdot F_p \cdot F_2 \cdot S \cdot F_1 \cdot A_{tx} \begin{pmatrix} 1 \\ -i \end{pmatrix}. \qquad (15)$$

where $A_{tx}$, and $A_{rx}$ are the effects of the transmitter and receiver non-idealities, modeled by a matrix A, and normalized to the electric field in the X polarization $$A = \begin{pmatrix} 1 & \delta_1 \\ \delta_2 & m \cdot e^{j\phi_{xy}} \end{pmatrix}, \qquad (16)$$

$$A_{tx} = \begin{pmatrix} 1 & \delta_{1_{tx}} \\ \delta_{2_{tx}} & m_{tx} \cdot e^{j\phi_{xy_{tx}}} \end{pmatrix},$$

$$A_{rx} = \begin{pmatrix} 1 & \delta_{1_{rx}} \\ \delta_{2_{rx}} & m_{rx} \cdot e^{j\phi_{xy_{rx}}} \end{pmatrix},$$

with m being the amplitude difference between the two antenna axes in a Jones basis (e.g., $m_{tx}$, and $m_{rx}$ are the amplitude differences between the two antenna axes respectively for the transmitter and receiver, i.e., $$m_{rx} = \frac{A_{rxY_{co-pol}}}{A_{rxX_{co-pol}}}),$$

and $\phi_{xy}$ is the phase offset between X and Y polarization (i.e., $\phi_{xy_{tx}}$ and $\phi_{xy_{rx}}$ are the phase offsets for the transmitted and received signals). The cross-polar component $\delta_1$ is defined as the cross-pol field in X normalized by the power in the channel X, and $\delta_2$ is the cross-pol component for the Y polarization normalized by the power in the X polarization, i.e., $$\delta_1 = \frac{A_{X_{x-pol}}}{A_{X_{co-pol}}},$$

$$\delta_2 = \frac{A_{Y_{x-pol}}}{A_{X_{co-pol}}}.$$

Note that if this calibration scheme is applied for circular antennas, the antenna axes shall be defined consistent with Jones nomenclature.

$F_n\{n=p, 2, 1\}$, detailed in Equation 17 represents a rotation matrix that can remedy the Faraday rotation in the transmitter (n=1) and receiver (n=2) paths, as well as for n=p, which represents the rotation due to polarization misalignment between the antenna and the bistatic geometry, defined in FIGS. 8A-C. $[1, -i]^T$ is the Jones representation of the RHCP transmitted signal. The rotation matrices are defined clockwise as the sense of the Faraday rotation is clockwise.

$$F_n = \begin{pmatrix} \cos(\Omega_n) & \sin(\Omega_n) \\ -\sin(\Omega_n) & \cos(\Omega_n) \end{pmatrix}, \tag{17}$$

where $\Omega_n$ is the rotation angle due to Faraday rotation or polarization misalignment.

S is the Sinclair scattering matrix, which can be approximated by a diagonal matrix where the cross-talk terms are assumed to be negligible, and the $S_{HH}$ and $S_{VV}$ can be approximated by the Fresnel reflection coefficients:

$$S = \begin{pmatrix} S_{HH} & S_{HV} \\ S_{VH} & S_{VV} \end{pmatrix} \sim \begin{pmatrix} R_{HH} & 0 \\ 0 & R_{VV} \end{pmatrix}, \tag{18}$$

$$R_{HH} = \frac{\cos(\theta) - \sqrt{\varepsilon_r - \sin(\theta)^2}}{\cos(\theta) + \sqrt{\varepsilon_r - \sin(\theta)^2}},$$

$$R_{VV} = \frac{\varepsilon_r \cdot \cos(\theta) - \sqrt{\varepsilon_r - \sin(\theta)^2}}{\varepsilon_r \cdot \cos(\theta) + \sqrt{\varepsilon_r - \sin(\theta)^2}},$$

with $\varepsilon_r$ being the dielectric permittivity of the soil, which depends on the soil texture ($F_{soil}$) and the soil moisture (SM).

As the matrix is diagonal, they can be commuted, and the received signal can be calibrated by means of:

$$\begin{pmatrix} E_{RX}^c \\ E_{RY}^c \end{pmatrix} = A_{tx}^{-1} \cdot F_1^{-1} \cdot F_2^{-1} \cdot F_p^{-1} \cdot A_{rx}^{-1} \cdot \begin{pmatrix} E_{RX} \\ E_{RY} \end{pmatrix}, \tag{19}$$

$$\begin{pmatrix} E_{RX}^c \\ E_{RY}^c \end{pmatrix} = A_{tx}^{-1} F_1^{-1} F_2^{-1} F_p^{-1} A_{rx}^{-1} A_{rx} F_p F_2 S F_1 A_{tx} \begin{pmatrix} 1 \\ -i \end{pmatrix} = S \cdot \begin{pmatrix} 1 \\ -i \end{pmatrix}.$$

In many embodiments, vectors of received GNSS signals are first multiplied by the inverse of the receiver calibration matrix, then by the set of polarization corrections and Faraday rotations, and finally by the inverse of the transmitter calibration matrix. With these operations, the inverse of the polarization and Faraday rotation is now a counter-clock rotation.

To compensate for transmitter or receiver effects (i.e., $A_{tx}$, or $A_{rx}$), the corresponding matrix needs to be inverted. The resultant matrix to compensate for the transmitter or receiver effects is:

$$A^{-1} = \begin{pmatrix} 1 & -\delta_1' \cdot e^{-i\phi_{xy}} \\ -\delta_2' \cdot e^{-i\phi_{xy}} & \frac{1}{m} \cdot e^{-i\phi_{xy}} \end{pmatrix}, \tag{20}$$

where $\delta_1'$ and $\delta_2'$ are the cross-pol components both normalized by the Y axis i.e.

$$\delta_1' = \frac{A_{X_{x-pol}}}{A_{Y_{co-pol}}}, \, \delta_2' = \frac{A_{Y_{x-pol}}}{A_{Y_{co-pol}}}.$$

Therefore, the corrected electrical fields of received signals can be written as:

$$E_{RX}^c = E_{RX} - \delta_1' \cdot e^{-j\phi_{xy}} \cdot E_{RY} \tag{21}$$

$$E_{RY}^c = \frac{1}{m} \cdot e^{-j\phi_{xy}} \cdot E_{RY} - \delta_2' \cdot e^{-j\phi_{xy}} \cdot E_{RX},$$

where superscript c indicates the corrected electrical field.

The corrected Stokes parameters are computed by multiplying the existing Stokes parameters by a Mueller matrix, as shown in Equation 22 which considers the aforementioned non-idealities:

$$\overrightarrow{S_{xy}} = M_{xy} \cdot \vec{S}, \tag{22}$$

with $\vec{S}$ being the non-calibrated Stokes parameters, $\overrightarrow{S_{xy}}$ represents the corrected Stokes parameters for a receiver or transmitter non-ideality (represented by the subscript xy), and $M_{xy}$ the Mueller matrix modeling the non-idealities as $$M_{xy} = \begin{bmatrix} \frac{m^2+1}{2m^2} + \frac{\delta_1'^2 + \delta_2'^2}{2} & \frac{m^2-1}{2m^2} + \frac{-\delta_1'^2 + \delta_2'^2}{2} & -\delta_1'\cos(\phi_{xy}) - \frac{\delta_2'}{m} & \delta_1'\sin(\phi_{xy}) \\ \frac{m^2=1}{2m^2} + \frac{\delta_1'^2 + \delta_2'^2}{2} & \frac{m^2+1}{2m^2} - \frac{\delta_1'^2 + \delta_2'^2}{2} & -\delta_1'\cos(\phi_{xy}) + \frac{\delta_2'}{m} & \delta_1'\sin(\phi_{xy}) \\ -\delta_2' \cdot \cos(\phi_{xy}) - \frac{\delta_1'}{m} & -\delta_2' \cdot \cos(\phi_{xy}) + \frac{\delta_1'}{m} & \frac{\cos(\phi_{xy})}{m} + \delta_1' \cdot \delta_2' & -\frac{\sin(\phi_{xy})}{m} \\ -\delta_2' \cdot \sin(\phi_{xy}) & -\delta_2' \cdot \sin(\phi_{xy}) & \frac{\sin(\phi_{xy})}{m} & \frac{\cos(\phi_{xy})}{m} - \delta_1' \cdot \delta_2' \end{bmatrix}$$

$\delta_x$ and m are in voltage units. Also, when $\delta_x=0$, m=1 and $\phi_{xy}=0°$, and the X/Y axes are aligned with the reflection H/V plane, then the Mueller matrix becomes an identity matrix:

$$M_{ideal} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

Finally, to compensate for a clockwise rotation effect such as Faraday rotation or polarization misalignment, the second and third Stokes parameters will be compensated as a Mueller matrix:

$$M_{rot} = \begin{bmatrix} 1 & 0 & 0 & 0 \\ 0 & \cos(2\Omega_n) & -\sin(2\Omega_n) & 0 \\ 0 & \sin(2\Omega_n) & \cos(2\Omega_n) & 0 \\ 0 & 0 & 0 & 1 \end{bmatrix}.$$

As an example, for the polarization misalignment presented in FIG. 8C where $\Omega = 225°$, $$\bar{S}_1^c = -\bar{S}_2,$$

and $$\bar{S}_2^c = \bar{S}_1.$$

The physical meaning of this rotation is to align the received signal with the antenna's basis (i.e., the signal is coming with a counterclockwise angle of 225° with respect to our antenna, so we rotate the received signal to align with our antenna).

The steps to calibrate for all the effects described above are therefore summarized in Equation 23:

$$\vec{S}^c = M_{tx}M_{Far}M_{align}M_{rx} \cdot \vec{S} \qquad (23)$$

with $M_{tx}$ being the Mueller matrix of the transmitter, following Equation 22. $M_{Far}$ is the Mueller matrix for Faraday rotation $M_{rot} \cdot M_{align}$ is the Mueller matrix for polarization alignment, following $M_{rot}$, and $M_{rx}$ is the receiver's Mueller matrix, as defined in Equation 22.

The algorithms described above can be applied to any base polarization set, in particular to circular antennas. The only requirement is to define the Stokes parameters as in Equation 14 and provide the receiver correction effects (e.g., antenna pattern gain) in TE and TM modes (i.e., E and H planes).

Signal to Noise Ratio (SNR) from Stokes Parameters

The $E_{RH}$ and $E_{RV}$ components received by the H and V polarization of GNSS receivers can be used to generate the Stokes parameters of the received signal:

$$S_0 = <|E_{RH}|^2> + <|E_{RV}|^2> + 2N_0, \qquad (24)$$

$$S_1 = <|E_{RH}|^2> - <|E_{RV}|^2>,$$

$$S_2 = 2 < \mathrm{Re}\{E_{RH}E_{RV}^*\}>,$$

$$S_3 = 2 < \mathrm{Im}\{E_{RH}E_{RV}^*\}>,$$

where $N_0$ is the sum of the receiver noise level in the H and V channels, and Re and Im are the real and imaginary parts of the complex multiplication between $$E_{RH}E_{RV}^*.$$

The H, V, RHCP, and LHCP components can therefore be computed from the Stokes parameters as:

$$|E_{RR}|^2 = \frac{S_0 + S_3}{2}, \quad |E_{RL}|^2 = \frac{S_0 - S_3}{2}, \qquad (25)$$

$$|E_{RH}|^2 = \frac{S_0 + S_1}{2}, \quad |E_{RV}|^2 = \frac{S_0 - S_1}{2},$$

where $|E_{RR}|^2$ is the total power integrated waveform at an RHCP-polarized antenna, $|E_{RL}|^2$ for an LHCP-polarized antenna, $|E_{RH}|^2$ is the total power integrated waveform at an H-polarized antenna and $|E_{RV}|^2$ for a V-polarized antenna. Considering that the $S_0$ noise level can be two times larger in $S_0$ than in the single antenna components, each SNR is retrieved in dB units as:

$$SNR_{RR} = SNR_{S_0} + 10\log_{10}\left(2 \cdot \frac{|E_{RR}|^2}{S_0}\right) \qquad (26)$$

$$SNR_{RL} = SNR_{S_0} + 10\log_{10}\left(2 \cdot \frac{|E_{RL}|^2}{S_0}\right)$$

$$SNR_{RH} = SNR_{S_0} + 10\log_{10}\left(2 \cdot \frac{|E_{RH}|^2}{S_0}\right)$$

$$SNR_{RV} = SNR_{S_0} + 10\log_{10}\left(2 \cdot \frac{|E_{RV}|^2}{S_0}\right)$$

The receiver's effective noise bandwidth and its noise level depend on the effective bandwidth and the noise system temperature. The effective noise bandwidth (B) changes with the coherent integration time, as detailed in Equation 27:

$$B = \frac{1}{2 \cdot T_c}, \qquad (27)$$

$$P_{noise} = k \cdot T_0 \cdot B \cdot F,$$

$$F = 1 + \frac{T_e}{T_0},$$

where k is the Boltzmann constant, $T_0$ is the reference temperature, F is the noise factor, $T_c$ is the coherent integration time, and $T_e$ is the receiver noise temperature. In some embodiments, the reference temperature is 290 K. In certain embodiments that use signals with two codes multiplexed (e.g., in the L2C band), they (e.g., the medium-length L2CM and the long-length L2CL) are coherently averaged. Hence, to generalize it to a single-code signal, 3 dB should be subtracted from Equation 27.

Reflectivity Approximation

To obtain the reflectivity, full Stokes parameters are computed from the signals transmitted at Right Hand Circular Polarization (RHCP, or R), which reflect off of the Earth's surface and are measured at H-pol and V-pol. This is summarized in Equation 28:

$$S_0 = <|E_{RH}|^2> + <|E_{RV}|^2>, \qquad (28)$$

$$S_1 = <|E_{RH}|^2> - <|E_{RV}|^2>,$$

US 12,644,993 B2

19                                                                           20

-continued $$S_2 = 2 < \text{Re}\{E_{RH}E_{RV}^*\} >,$$

$$S_3 = 2 < \text{Im}\{E_{RH}E_{RV}^*\} > .$$

If cross-polarization is considered negligible, i.e., $\Gamma_{HV}\sim\Gamma_{VH}$ are at least an order of magnitude smaller than $\Gamma_{HH}$ and $\Gamma_{VV}$, which is the case for L-band forward scatter radar, then the reflectivity can be approximated as:

$$\Gamma_{HH} \cong \frac{S_0 + S_1}{2} \tag{29}$$

$$\Gamma_{VV} \cong \frac{S_0 - S_1}{2}$$

assuming $S_0$ is properly calibrated using the known radar equation.

Network Implementation

Figure 9:
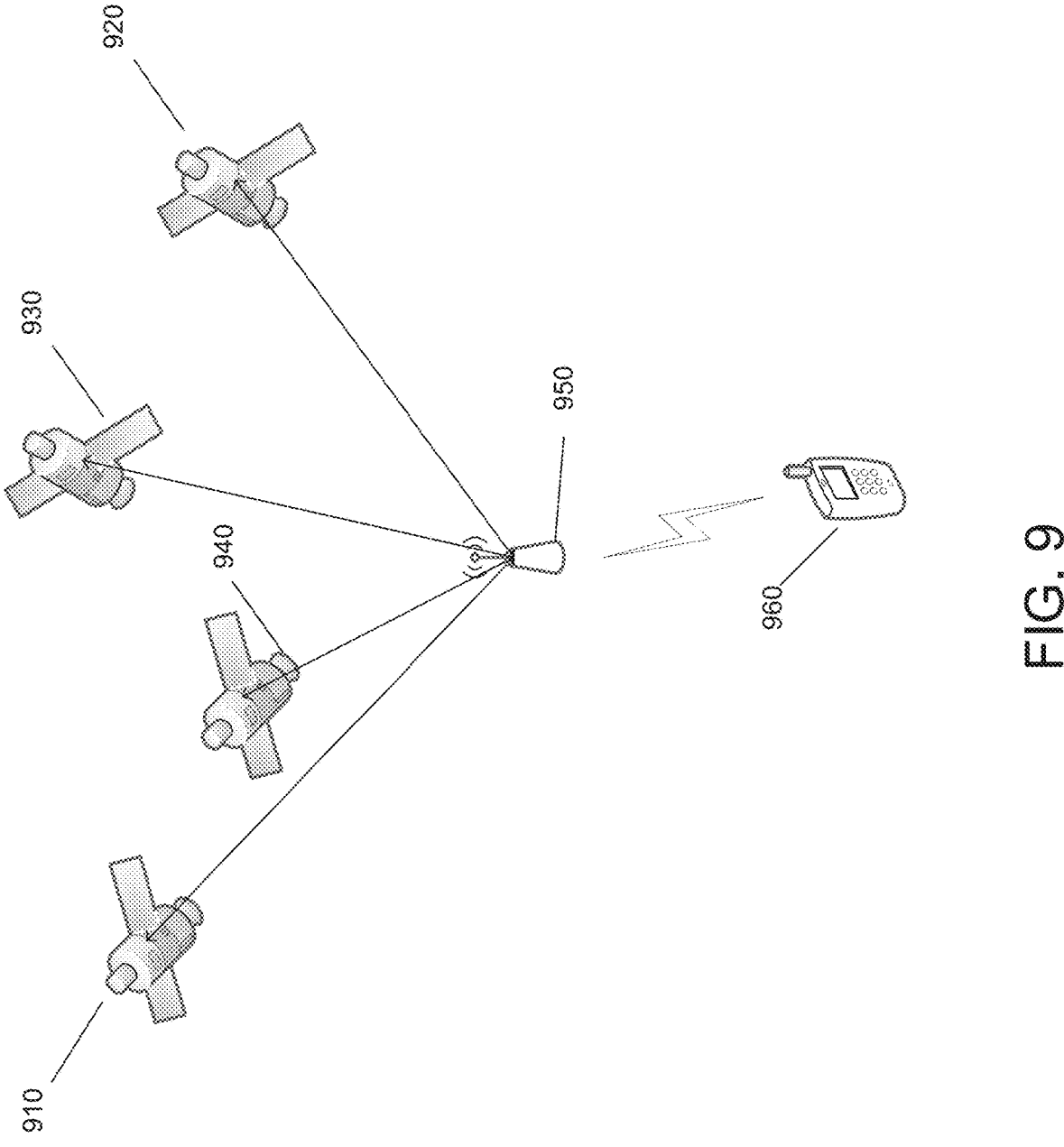
FIG. 9 illustrates a system architecture for positioning using GNSS signals in accordance with an embodiment of the invention.

FIG. 9 illustrates a system architecture for positioning using GNSS signals in accordance with an embodiment of the invention. In several embodiments, system 900 includes at least four satellites, 910, 920, 930, and 940. In many embodiments, the at least four satellites, 910, 920, 930 and 940, are capable of positioning a remote device and are connected to a wireless network 950. Satellites can include both transmitters and receivers that are capable of transmitting GNSS signals and receiving GNSS signals reflected off of surfaces. In many embodiments, each of the at least four satellites includes at least a pair of orthogonally linear polarized antennae configured to pick up reflected GNSS signals in horizontal and vertical components. Satellites can be configured with HCP GNSS systems to better determine positions of points through GNSS signals affected by multipath. Satellites can also be used to determine positions of other computing devices. Satellites may receive input from computing devices 960 requesting localization. In selected embodiments, computing devices include mobile devices. Mobile devices can include a GNSS receiver that is implemented in it. GNSS receivers can be configured to process received GNSS signals, or receivers on the at least four satellites can process GNSS signals. In several embodiments, satellites can access data from a records database or repository through network 950.

Processes that provide the methods and systems for positioning in accordance with some embodiments are executed by a computing device 960 or computing system, such as a desktop computer, tablet, mobile device, laptop computer, notebook computer, server system, and/or any other device capable of performing one or more features, functions, methods, and/or steps as described herein. Computing device 960 may be a remote computing device connected to network 950 using a wireless cellular connection.

Hardware Implementation

Figure 10:
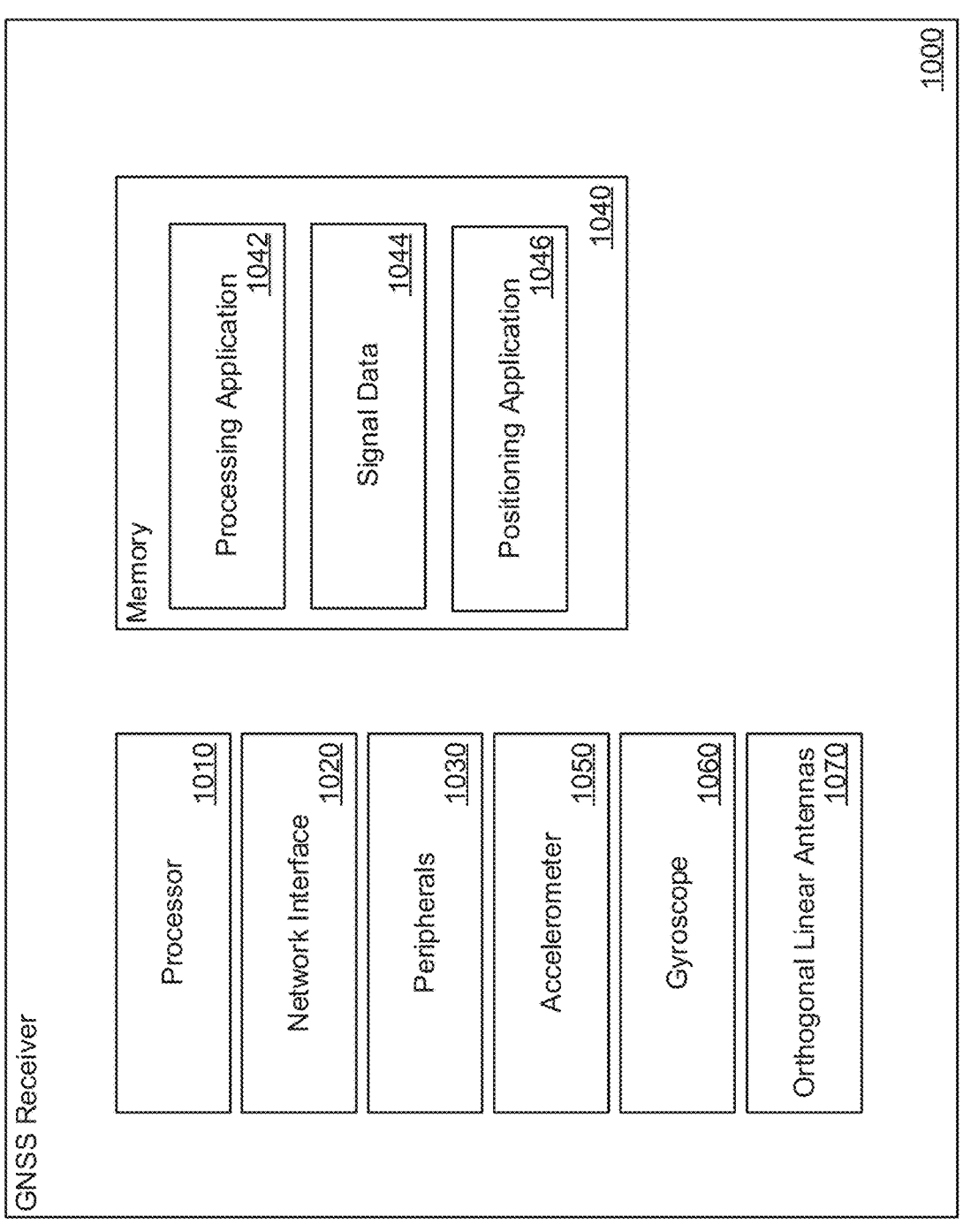
FIG. 10 illustrates a GNSS receiver device that can be utilized to perform positioning using GNSS signals in accordance with an embodiment of the invention.

FIG. 10 illustrates a GNSS receiver device that can be utilized to perform positioning using GNSS signals in accordance with an embodiment of the invention. GNSS receiver 1000 includes a processor 1010. Processor 1010 may direct processing application 1042 to process received signals. Processing application can be configured to perform a calibration process such as (but not limited to) the various calibration processes described above. Once the calibration process is performed, the calibration information can then be used by positioning application 1046 to perform location measurements. Processing application 1042 and positioning application 1046 can be stored in memory 1040. Received signals that need to be processed can be stored in signal storage 1044

In many embodiments, processor 1010 can include a processor, a microprocessor, a controller, or a combination of processors, microprocessor, and/or controllers that performs instructions stored in a memory 1040 to classify and detect gastroparesis. Processor instructions can configure the processor 1010 to perform processes in accordance with certain embodiments of the invention. In various embodiments, processor instructions can be stored on a non-transitory machine-readable medium.

GNSS receiver 1000 further includes network interface 1020 that can receive various types of data from external sources. GNSS receiver may further include peripheral 1030. Peripherals 1030 can include any of a variety of components for capturing data, such as (but not limited to) mice, keyboards, and/or sensors. In a variety of embodiments, peripherals can be used to gather inputs and/or provide outputs. In several embodiments, GNSS receiver includes accelerometers 1050 and gyroscopes 1060. Accelerometer and gyroscope can be used in conjunction with direct GNSS signals processed by processing application to determine the position of GNSS receiver. In numerous embodiments, GNSS receivers include at least one pair of orthogonal linear antennas 1070. The at least one pair of orthogonal linear antennas can be used to receive GNSS signals.

Although a specific example of a GNSS receiver is illustrated in this figure, any of a variety of GNSS receivers can be utilized to provide positioning information similar to those described herein as appropriate to the requirements of specific applications in accordance with embodiments of the invention.

In accordance with still other embodiments, the instructions for the processes can be stored in any of a variety of non-transitory computer-readable media appropriate to a specific application.

Although specific methods of a GNSS using Stokes parameters are discussed above, many different methods of a GNSS using Stokes parameters can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A Global Navigation Satellite System (GNSS) using GNSS signals, the system comprising:
    at least four satellites, each satellite comprising:
        at least one pair of antennas; and
        a transmitter, configured to transmit GNSS positioning signals to a receiver; and
    a receiver, comprising:
        a memory containing a positioning application; and
        a processor comprising a set of one or more processors,
            wherein the positioning application configures the set of one or more processors to determine a position of the receiver by performing the steps of:

collecting horizontal and vertical linear components of transmitted GNSS positioning signals;

computing Stokes parameters of collected GNSS signals;

obtaining tuning parameters based on computed Stokes parameters;

synthesizing new polarization signal using tuning parameters; and processing new polarization signal to obtain a position of the location.

2. The system of claim 1, wherein the at least one pair of antennas is a pair of orthogonally polarized antennas.

3. The system of claim 2, wherein one antenna of the pair of antennas measures horizontal components of the reflected signals, and the other antenna of the pair of antennas measures vertical components of the reflected signals.

4. The system of claim 1, wherein the transmitted signal is right hand circularly polarized.

5. The system of claim 1, wherein the receiver measures multipath quality of the transmitted signals.

6. The system of claim 5, wherein the receiver eliminates reflected signals from a satellite from being further processed if the multipath quality is below a threshold, and the receiver collected reflected signals from sufficient satellites to perform positioning.

7. The system of claim 1, wherein the third Stokes parameter undergoes a constrained maximization process to force the magnitude of the third Stokes parameter to be close to 1.

8. The system of claim 1, wherein the tuning parameters are obtained by multiplying Mueller matrices with computed Stokes parameters.

9. The system of claim 1, wherein the new polarization signals are synthesized in real time using new signals collected by the antennas.

10. The system of claim 9, wherein the new polarization signals are selected from direct signals to minimize multipath.

11. The system of claim 7, wherein the constrained maximization process is performed periodically.

12. The system of claim 1, wherein the first Stokes parameter is the sum of incoherently integrated DDMs of X and Y polarization channels of the received signal.

13. The system of claim 1, wherein the second Stokes parameter is the difference of incoherently integrated DDMs of X and Y polarization channels of the received signal.

14. The system of claim 1, wherein the third Stokes parameter is the real part of the cross-correlation between X and Y polarization channels of the received signal.

15. The system of claim 1, wherein the fourth Stokes parameter is the imaginary part of the cross-correlation between X and Y polarization channels of the received signal.

16. A Global Navigation Satellite System (GNSS) receiver, comprising:

at least one pair of orthogonally polarized antennas;

a memory containing a positioning application; and a processor comprising a set of one or more processors, wherein the positioning application configures the set of one or more processors to determine a position of the receiver by performing the steps of:

collecting horizontal and vertical linear components of transmitted GNSS positioning signals;

computing Stokes parameters of collected GNSS signals;

obtaining tuning parameters based on computed Stokes parameters;

synthesizing new polarization signal using tuning parameters; and processing new polarization signal to obtain a position of the location.

17. An Earth observation system using GNSS signals, the system comprising:

at least one transmitting satellite, the satellite comprising:

at least one pair of orthogonally linear polarized antennas; and a transmitter, configured to transmit GNSS positioning signals to a location;

at least one receiving satellite, comprising:

at least one pair of orthogonally linear polarized antennas;

a memory containing a positioning application; and a processor comprising a set of one or more processors, wherein the positioning application configures the set of one or more processors to measure properties of the location by performing the steps of:

collecting horizontal and vertical linear components of transmitted GNSS positioning signals reflected off of the location;

computing Stokes parameters of collected GNSS signals; and measuring a plurality of properties of the location based on the Stokes parameters.

18. The system of claim 17, wherein the receiving satellite is a GNSS-R satellite.

19. The system of claim 17, wherein the GNSS-R receiver comprises a ground-based receiver device and an aircraft-equipped receiver.

20. The system of claim 17, wherein the Stokes parameters are computed by:

capturing horizontal and vertical linear components of the collected GNSS signal;

generating Delay-Doppler Maps (DDMs) based on the collected signals; and computing Stokes parameters based on scattering coefficients of collected signals.

21. The system of claim 17, wherein the Stokes parameters are computed after correlation is performed and complex DDMs are obtained.

22. The system of claim 17, wherein the first Stokes parameter is the sum of incoherently integrated DDMs of X and Y polarization channels of the received signal.

23. The system of claim 17, wherein the second Stokes parameter is the difference of incoherently integrated DDMs of X and Y polarization channels of the received signal.

24. The system of claim 17, wherein the third Stokes parameter is the real part of the cross-correlation between X and Y polarization channels of the received signal.

25. The system of claim 17, wherein the fourth Stokes parameter is the imaginary part of the cross-correlation between X and Y polarization channels of the received signal.

* * * * *